United States Patent [19]

Walley

[11] 4,106,389
[45] Aug. 15, 1978

[54] AIRCRAFT WEAPON MOUNTINGS

[75] Inventor: Gerald David Walley, Preston, England

[73] Assignee: British Aircraft Corporation, London, England

[21] Appl. No.: 795,626

[22] Filed: May 10, 1977

[30] Foreign Application Priority Data

May 14, 1976 [GB] United Kingdom ............ 20084/76

[51] Int. Cl.² ............................................. F41F 3/06
[52] U.S. Cl. .................................. 89/1.815; 89/1.816
[58] Field of Search ................ 89/1.819, 1.815, 1.816, 89/1.817, 1.818, 1.8, 1.802

[56] References Cited

U.S. PATENT DOCUMENTS

| | | | |
|---|---|---|---|
| 2,409,210 | 10/1946 | Jolly | 89/1.815 |
| 2,709,947 | 6/1955 | Woods | 89/1.815 |
| 2,731,885 | 1/1956 | Nolan | 89/1.815 |
| 2,900,874 | 8/1959 | Tjossem | 89/1.815 |
| 2,975,676 | 3/1961 | Butler | 89/1.815 X |
| 3,053,488 | 9/1962 | Cox | 89/1.817 X |
| 3,077,144 | 2/1963 | Barker et al. | 89/1.819 |
| 3,303,740 | 2/1967 | Grayson et al. | 89/1.819 X |

Primary Examiner—David H. Brown
Attorney, Agent, or Firm—Cushman, Darby & Cushman

[57] ABSTRACT

An aircraft has a fuselage with a forward cockpit, an aft mounted fin, and an upper deck extending between the two, there being a weapon launcher assembly of elongated form with a forward end through which rocket propelled weapons are launched, a rearward end through which rocket exhaust is dissipated, and an upper deck extending between the two, the launcher being pivotable between a stowed position wherein it lies with its upper deck smoothly continuous with the upper deck of the fuselage and an extended weapon launch position wherein the weapons can be launched clear of the forward cockpit.

7 Claims, 4 Drawing Figures

AIRCRAFT WEAPON MOUNTINGS

This invention relates to the mounting of launcher means for rocket powered weapons on aircraft and has included in its objectives the provision of a launcher means which gives low drag during the majority of aircraft flight time with the possible exception of the brief period of weapon launch, is positioned such that the airframe is generally free for the carriage of externally mounted weapons and other stores, and moreover, extends to a weapon launch position such that the launched weapons not only readily clear the aircraft, but are directed in the general direction in which they will subsequently travel.

According to the invention an aircraft has a fuselage with a forward cockpit region, an aft empennage region, an upper deck region extending between the two regions, a launcher assembly for housing and launching at least one rocket propelled weapon, the launcher assembly being of elongated form with a forward end region through which the weapon is launched, a rearward end region through which rocket exhaust gases are dissipated, and an upper deck region extending between said end regions, a trough in the fuselage upper deck region formed to accommodate the launcher assembly in a stowed position such that its upper deck region lies smoothly continuously with the fuselage upper deck region, hinge means, and jack means, spaced from the hinge means, connecting the launcher assembly to the fuselage, the arrangement being such that the launcher assembly can be moved from the stowed position to an extended position in which the weapon can be launched.

Two embodiments of the invention are described with reference to the accompanying drawings in which.

Figure 1:
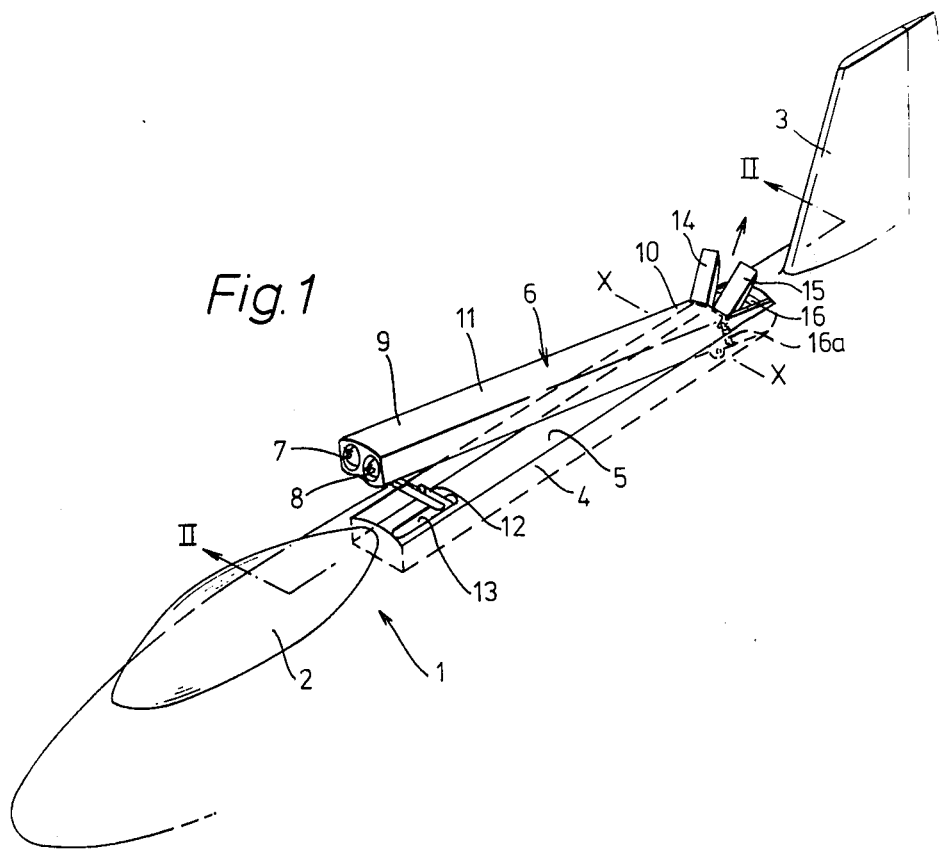
FIG. 1 is a perspective view of an upper part of an aircraft fuselage.
Figure 2:
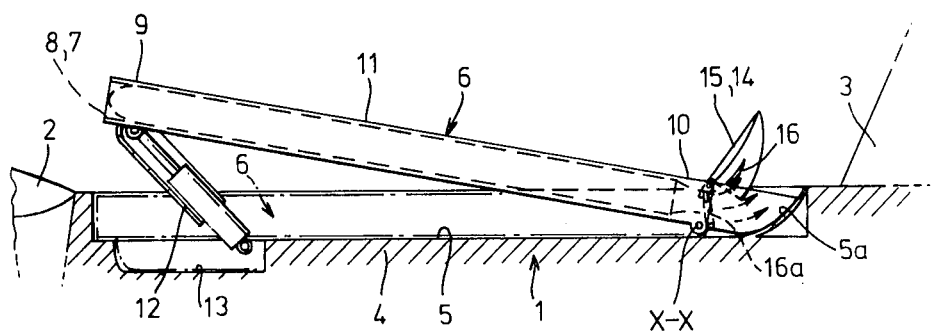
FIG. 2 is a part-sectional view of the aircraft fuselage, the section being taken on line II—II of FIG. 1.

In FIGS. 1 and 2 an aircraft has a fuselage 1 with a forwardly mounted cockpit having a canopy 2 and a rearwardly mounted empennage exemplified by a vertical fin 3. Between the canopy and the fin extends an upper deck region 4 within which is formed an elongated trough 5 being rectangular in plan. Arranged to fit within this trough 5 is weapon launcher assembly 6 containing two parallel weapon housing and launching tubes 7 and 8. The launcher assembly 6 has a forward end region 9 through which the housed weapons are launched, and a rearward end region 10 through which rocket exhaust gases are dissipated on such launch.

Between the forward and the rearward regions of the launcher assembly extends an upper deck region 11 arranged to lie in smoothly continuous relationship with the upper deck region 4 of the fuselage when the launcher assembly 6 lies within the trough 5 in a stowed position.

The rearward region 10 of the launcher assembly 6 is pivoted to the fuselage structure at the base of the trough 5 about a transverse axis X—X whilst the forward region 9 is provided with a telescopic fluid operated jack 12 which is pivoted to the fuselage structure at the base of the trough 5. Extension of the jack 12 urges the launcher assembly out of the trough, the assembly pivoting about the axis X—X until the position of the Figures is reached, that is to say with the tubes 7 and 8 inclined in a forwards and upwards direction sufficiently for the emerging weapons to clear the cockpit canopy 2.

In the stowed position, the jack 12 conveniently lies in a groove 13 formed at the base of the trough 5.

To ensure that the exhaust gases from the rocket motors of the weapons are dissipated without damage to the aircraft structure, a rearward region of the trough 5 is formed with fixed deflecting plates 5a shaped in a concave manner so that any gases impinging thereon are deflected upwards and outboard. Additionally, the rearward region of the launcher assembly is provided with hinged outwardly opening doors 14 and 15 each carrying guide vanes 16. In the stowed position these door 14 and 15 are arranged to lie in smooth continuous relationship with the upper deck regions of the launcher assembly and the fuselage to close any exhaust apertures, and when in the extended position are arranged to direct the exhaust gases laterally to either side of the fin 3 in addition to upwards and outboard. The doors 14 and 15 are actuated by small jacks 16a.

Figure 3:
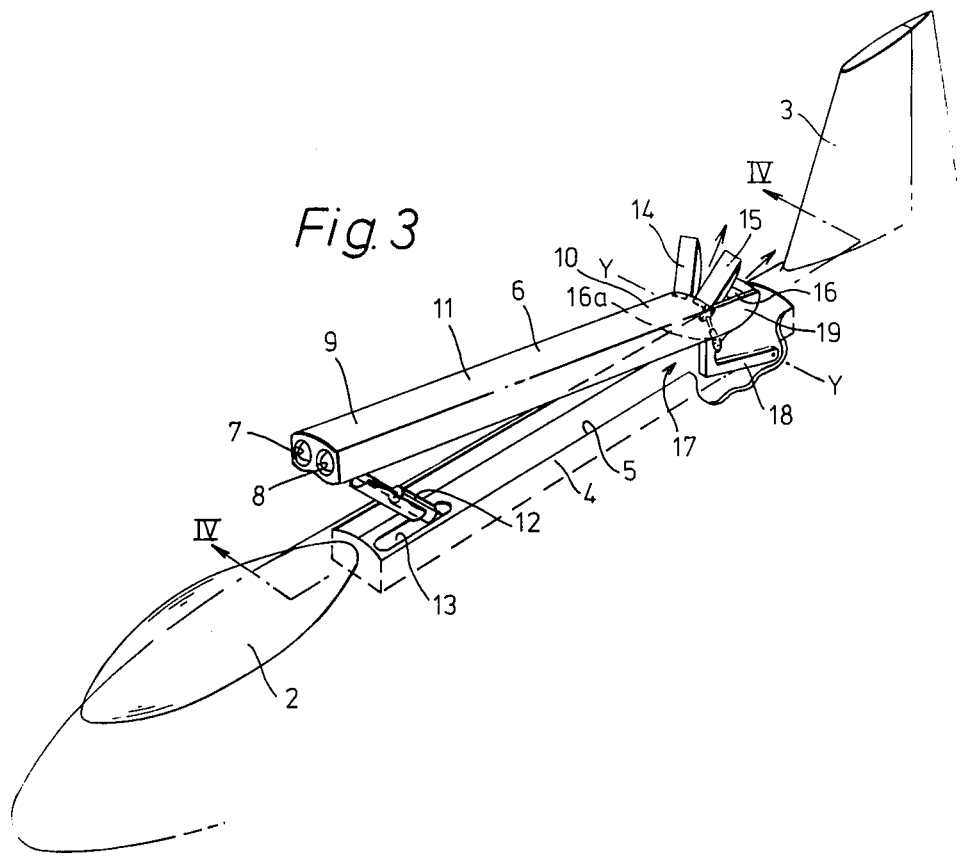
FIG. 3 is a similar view to that of FIG. 1 but illustrating an alternative embodiment, and, FIG. 4 is a similar view to that of FIG. 2 but with the section being taken on line IV-IV of FIG. 3.
Figure 4:
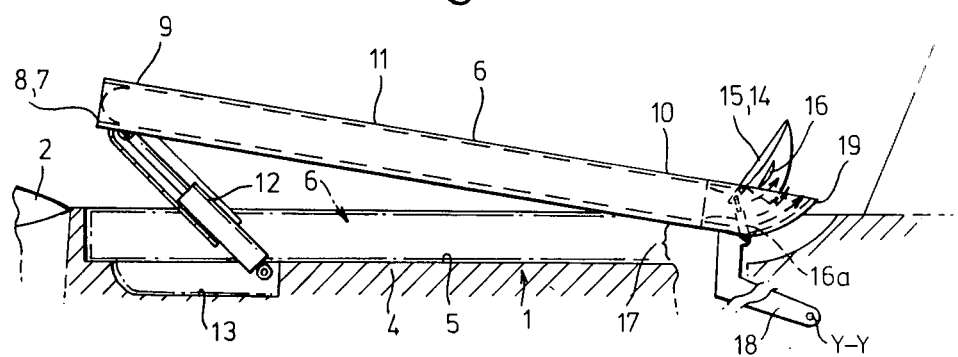

FIGS. 3 and 4 illustrate a similar arrangement to the earlier Figures, and as such like components have been allotted like reference numerals. The distinguishing feature is that in the extended, weapon launch position of FIGS. 3 and 4, the rearward region 10 of the launcher assembly is raised above the base of the trough 5 to provide a gap 17 through which air between the extended launcher assembly and the fuselage can freely pass without becoming trapped. To effect this an elongated cranked pivot arm assembly 18 is provided. This carries the rearward end 10 of the launcher assembly and is pivoted to the aircraft fuselage about a transverse axis Y—Y. The rearward region 10 is formed with fixed rocket exhaust guideways 19, additional to those referenced 16, to ensure that the efflux is directed outboard.

I claim:

1. An aircraft having a fuselage with a forward cockpit region, an aft empennage region, an upper deck region extending between the two regions, a launcher assembly, for housing and launching at least one rocket propelled weapon, the launcher assembly being of elongated form with a forward end region through which the weapon is launched, a rearward end region through which rocket exhaust gases are dissipated, and an upper deck region extending between said end regions, a trough in the fuselage upper deck region formed to accommodate the launcher assembly in a stowed position such that its upper deck region lies smoothly continuously with the fuselage upper deck region, hinge means, and jack means, spaced from the hinge means, connecting the launcher assembly to the fuselage, the arrangement being such that the launcher assembly can be moved from the stowed position to an extended position in which the weapon can be launched.

2. An aircraft according to claim 1 wherein the hinge means connects the rearward region of the launcher assembly to the fuselage, and the jack means connects the forward region to the fuselage.

3. An aircraft according to claim 2 wherein the hinge means is such as to raise the rearward region of the launcher assembly so that air can pass between the fuselage and the assembly.

4. An aircraft according to claim 1 wherein the jack means is of fluid operated telescopic form.

5. An aircraft according to claim 1 wherein the rearward region of the launcher assembly includes deflection means to direct the rocket exhaust away from the fuselage.

6. An aircraft according to claim 5 wherein a hinged flap member is provided to cover the deflection means in the stowed position of the launcher means.

7. An aircraft according to claim 1 wherein the launching means accommodates two weapons side-by-side.